(12) United States Patent
Graf

(10) Patent No.: US 6,170,021 B1
(45) Date of Patent: Jan. 2, 2001

(54) SERVER COMPUTER I/O REDIRECTION TOOL

(75) Inventor: John D. Graf, Milpitas, CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/175,802

(22) Filed: Oct. 19, 1998

(51) Int. Cl.[7] .................................................. G06F 15/16
(52) U.S. Cl. .............................. 710/15; 709/219; 714/46; 714/57
(58) Field of Search .................................. 709/217–219; 710/15–19; 714/46, 57

(56) References Cited

U.S. PATENT DOCUMENTS

| | | | |
|---|---|---|---|
| 3,889,062 | * 6/1975 | Epstein | 379/100.01 |
| 4,377,852 | * 3/1983 | Thompson | 710/47 |
| 4,949,248 | * 8/1990 | Caro | 709/203 |
| 5,062,059 | * 10/1991 | Youngblood et al. | 709/217 |
| 5,276,863 | * 1/1994 | Heider | 709/222 |
| 5,349,675 | 9/1994 | Fitzgerald et al. | 395/800 |
| 5,455,933 | * 10/1995 | Schieve et al. | 714/27 |
| 5,577,210 | 11/1996 | Abdous et al. | 395/200.1 |
| 5,583,793 | * 12/1996 | Gray et al. | 709/223 |
| 5,687,096 | * 11/1997 | Lappen et al. | 345/2 |
| 5,721,842 | * 2/1998 | Beasley et al. | 710/131 |
| 5,732,212 | 3/1998 | Perholtz | 395/200.11 |
| 5,790,895 | * 8/1998 | Krontz et al. | 710/64 |
| 5,857,074 | * 1/1999 | Johnson | 709/217 |
| 5,884,096 | 3/1999 | Beasley et al. | 395/858 |
| 5,933,614 | * 8/1999 | Tavallaei et al. | 710/129 |
| 5,937,176 | * 8/1999 | Beasley et al. | 345/113 |
| 6,098,143 | * 8/2000 | Humpherys et al. | 710/260 |

OTHER PUBLICATIONS

Compaq Computer Corporation, "Remote Server Management with Integrated Remote Console", Technology Brief, pp. 1–10 (Oct. 21, 1996).

Phoenix Technologies Ltd., "Phoenix Technologies Announces Rom Pilot Pre–Boot Remote Diagnostic and Management Solution: First Software Solution to Deliver a Superset of Wired for Management Requirements", pp. 1–2 (1998) [on–line] Available http://www.phoenix.com/news/pr971103.html.

Intel Architecture Software Developers Manual, "System Programmer's Guide", vol. III, Chapter 11: *System Management Mode(SMM)*, pp. 11–1 to 11–6 (1997).

* cited by examiner

Primary Examiner—Sumati Lefkowitz (57) ABSTRACT

An operating system independent method and apparatus for redirecting a server computer's serial device input and display output to a remote console, through the coordinated use of a low-cost dedicated microcontroller integrated within the motherboard of the server computer, and a system management mode facility residing within the CPU microprocessor of the server computer. Upon receipt of a redirection request from a remote console, the microcontroller asserts a system management interrupt request, which is acknowledged and serviced by a handler routine residing within the system management mode. The system management interrupt handler routine then directly accesses serial device input and video output data residing within the server computer, and returns any redirection result to the microcontroller, which in turn, returns the redirection result to the requesting remote console.

34 Claims, 5 Drawing Sheets

SERVER COMPUTER I/O REDIRECTION TOOL

THE FIELD OF THE INVENTION

The present invention relates to remote server management tools in a distributed computing environment, and, more particularly to a method and apparatus for the redirection of a server computer's display output data and serial device input data to a remote console.

BACKGROUND OF THE INVENTION

Today, distributed computing environments are assuming an increasingly important role in the data processing activities of many organizations. A typical distributed computing environment often includes a plurality of widely dispersed server computers residing in remote locations. These server computers perform data management and other functions for one or more client computers which are attached to each server computer via a computer network. In the past, when a problem occurred with a server computer, an administrator would have to be physically dispatched to the remote server computer location in order to resolve the problem. However, such "office visits" were a costly, highly inefficient way of doing business.

As a result, several remote management tools were developed to enable administrators to manage server computers in remote locations via a computer network. Such tools allow administrators and technicians to diagnose and solve problems with remote server computers from a single, centralized server management console. Unfortunately, network management of a remote server computer requires that a network operating system be up and running on the remotely managed server computer. Oftentimes, the network operating system is not up and running when problems need to be diagnosed. For example, the crash of an operating system on the remote server computer often is the cause of the problem on the remote server computer.

Another set of management tools were developed to enable administrators to manage server computers in remote locations via a phone line connection used in conjunction with a dedicated bus-mastering card in the remote server computer. This bus-mastering hardware solution allows a remote console to directly read display memory and directly write keystrokes from/to a server computer, independent of the operating system. Under this implementation, the dial-up connection/dedicated busmastering card combination is able to remotely manage one or more server computers from a console, regardless of the type of operating system running on the server computer, the operating condition of the server computer, or the location of the server computer.

Examples of this type of dedicated bus-mastering card solution include: Compaq's Server Manager/R (circa 1991–1992); Hewlett Packard's Remote Assistant EISA card (1993); International Business Machines' Server Guard Card (circa 1994); Digital Equipment Corporation's Remote Server Manager (circa 1994); and Intel's LANDesk Server Monitor Module (circa 1994). While the bus-mastering hardware provides a reasonable level of flexibility and performance, it is a very expensive solution. Bus-mastering cards, such as those listed above, are typically sold as an accessory and represent a major portion of the total server computer price when such cards are placed in low cost, personal computer based server computers.

The increased use of server computers in distributing computing environments has created a need for a low-cost, operating system independent way to manage the server computer from a remote console. This solution should utilize, whenever possible, existing technology to maximize cost effectiveness and simplify the solution.

In recent years, manufacturers of personal computer microprocessors, such as the Intel ix86 series, have begun to incorporate management technologies within the microprocessor itself. In the case of Intel Corporation's family of Pentium (ix86 type) microprocessors, the feature is called System Management Mode (SMM).

Intel's System Management Mode (SMM) helps systems developers provide very high level system functions, such as power management and security, in a manner that is transparent not only to the application software but also to operating systems. SMM is one of the major operating modes within the Intel's ix86 architecture processors, on a level with protected mode, real-address mode, or virtual-86 mode. SMM, however, is intended for use only by firmware, not by applications software or general purpose systems software.

SUMMARY OF THE INVENTION

The present invention provides a computer system for communicating with a remote console via an asynchronous connection. A microcontroller receives a redirection request from the remote console, asserts a system management interrupt to process the redirection request, and returns a redirection result to the remote console via the asynchronous connection upon completion of the interrupt request. A central processing unit (CPU) has a system management mode for controlling a set of routines which are responsive to the system management interrupt asserted by the microcontroller to process the interrupt request, generate a redirection result, then return the redirection result to the microcontroller.

In one preferred embodiment of the present invention, serial device data, such as that generated by a keyboard or mouse, is transmitted from a remote console to the server computer's microcontroller ASIC via an asynchronous connection, such as a modem. Once the serial device data is received at the microcontroller, the data is translated into a set of serial device codes, such as scan codes for a keyboard serial device. The microcontroller then issues a system management interrupt request to the central processing unit's (CPU's) system management mode. In one embodiment, the CPU is an Intel ix86 type microprocessor, having an integrated System Management Mode (SMM) capability for receiving System Management Interrupt (SMI) requests from the microcontroller. After the CPU system management mode acknowledges the interrupt request, the microcontroller passes the serial device codes to the CPU system management mode. After receiving the serial device codes from the microcontroller, a CPU system management mode handler routine then writes the serial device codes directly into the server computer's serial device controller.

In another preferred embodiment of the present invention, a remote console issues a request to retrieve current video display data from a server computer via an asynchronous connection, such as a modem. The request is processed by the microcontroller ASIC, which, in turn, issues a system management interrupt request to the CPU system management mode to retrieve VGA CRTC register data. In one embodiment, the CPU is an Intel ix86 type microprocessor, having an integrated System Management Mode (SMM) capability for receiving System Management Interrupt (SMI) requests from the microcontroller. After the CPU system management mode acknowledges the system management interrupt request, the microcontroller passes the request to the CPU system management mode. The CPU system management mode handler processes the VGA CRTC register data. This register data includes the current screen mode, cursor position, and starting video address. This VGA CRTC data is then sent back to the microcontroller for analysis. If the microcontroller determines that the current screen mode is text, the microcontroller issues a second system management interrupt request to the CPU system management mode, this time asking for video screen data. Upon successful acknowledgment of the second system management interrupt request by the CPU system management mode, arguments including a starting screen address and the number of bytes to retrieve from the video buffer are passed from the microcontroller to the CPU system management mode. If the video data has changed from the last request, the CPU system management mode handler retrieves the screen data from the VGA buffer and returns the screen data to the microcontroller. After the screen data is passed back to the microcontroller, the microcontroller optimizes the screen data by returning to the remote console only the video data that has changed since the last request. Finally, the optimized screen data is returned to the remote console via the asynchronous connection (modem).

Unlike the expensive bus-mastering cards currently in use, the present invention utilizes the combination of a low-cost, dedicated application specific integrated circuit (ASIC) microcontroller mounted on the motherboard of the server, and the system management mode functionality already incorporated into the CPU microprocessor in order to provide the redirection capability. In one embodiment, the present invention uses the System Management Mode (SMM) integrated into Intel's ix86 type of processors to provide the redirection capability. However, the present invention is also compatible with similar system management mode capabilities from other CPU microprocessor manufacturers. Because of its network operating system (NOS) independence, the present invention provides the ability to view the server video output data (in text mode only) and send serial device input data independent of the operating system. A user at a remote console can view and interact with, among others: the boot sequence, any text mode screen when the network operating system is up and running, any text mode crash screen, a utility partition, and a DOS partition.

Through the combination of a low-cost, dedicated microcontroller integrated on the motherboard and the system management mode capabilities available in current personal computer microprocessors, such as Intel's ix86 type processors, the present invention provides an inexpensive, operating system independent apparatus and method for redirecting a server computer's display output data and serial device input data to a remote console.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
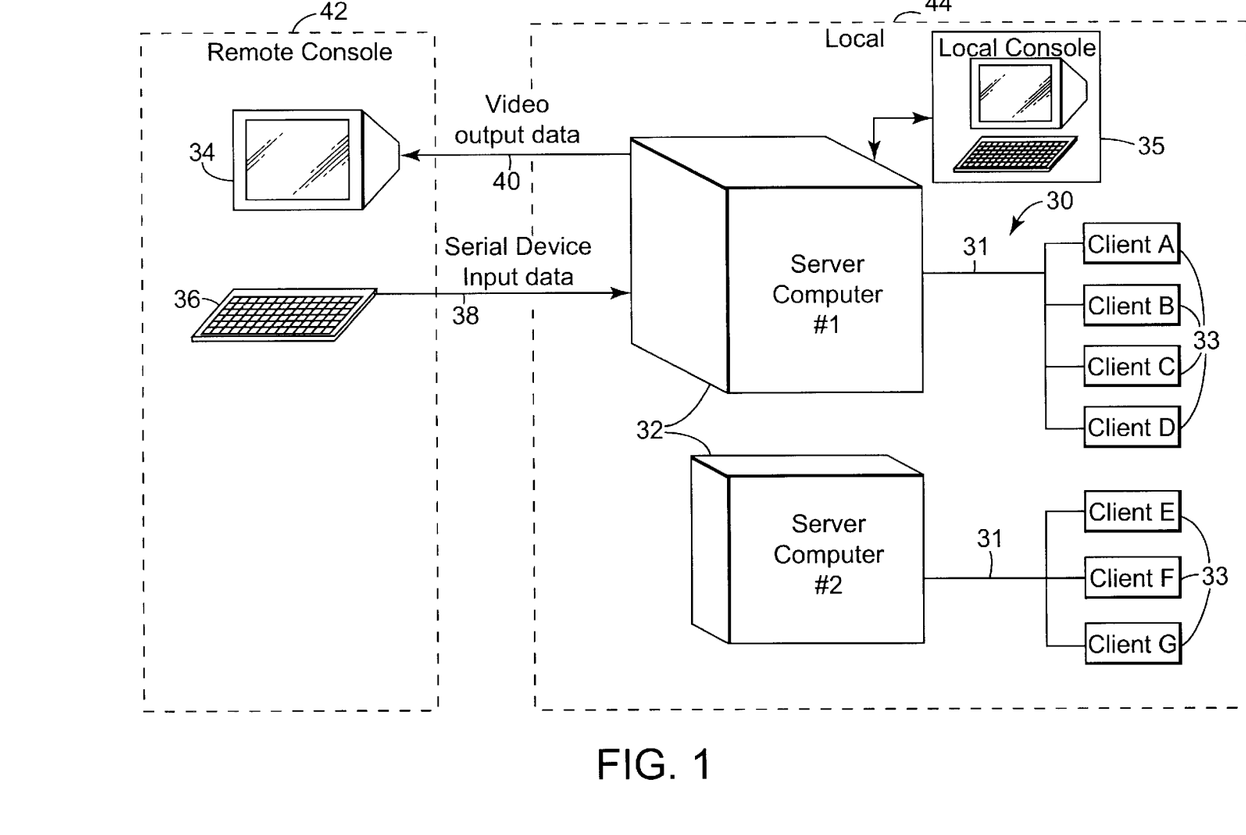
FIG. 1 is a generalized block diagram of a distributed computing environment illustrating console redirection.

FIG. 1 illustrates a distributed computing environment 30 which employs a console redirection feature of the present invention. The distributed enterprise computing environment 30 has one or more server computers 32 located in widely dispersed locations. Server computers 32 service client computers 33, such as workstations or personal computers. A local console 35 is attached to server computer 32. A remote console 42 includes a serial input device 36, such as a keyboard or mouse, and a display device 34. Remote console 42 is coupled to the server computers 32 and remotely manages the widely dispersed server computers 32. The connection between remote console 42 and server computer 32 can be made with numerous known connection devices. In one embodiment, the connection device is an asynchronous connection (shown in FIG. 2) such as a modem or dedicated serial line. One embodiment of an asynchronous connection is illustrated at 52 in FIG. 2, and includes a remote console modem 53 connected to a server computer modem 54. This modem-to-modem connection (between modems 53 and 54) is made through a phone line 51. Other types of suitable connections include a network connection, such as an Internet or Intranet connection.

In one embodiment of the present invention, serial device input data 38 is directed from serial device 36 of remote console 42 to server computer 32. The serial device input data 38 is directly written into a serial device controller 66 (shown in FIG. 2) within server computer 32. Thus, an administrator working at remote console 42, potentially thousands of miles away from the server computer 32, issues commands to server computer 32 just as if the administrator was typing on a keyboard directly connected to server computer 32.

The console redirection feature of the present invention is operating system independent. Serial device 36 of remote console 42 can directly request the server computer to accept serial input data to the serial (i.e., keyboard) input data controller, completely independent of the state or type of operating system employed on server computer 32.

In one embodiment of the present invention, video output data 40 from server computer 32 is directly accessed, retrieved, and displayed at a video monitor 34 of remote console 42. An administrator working at remote console 42, potentially thousands of miles away from the server computer 32, views and interacts with video output data and other operations of server computer 32 including: the boot sequence of server computer 32; any text mode screen of server computer 32 when the operating system is up and running; and any text mode crash screen of server computer 32. As with the serial device information, the redirection of video output data 40 from server computer 32 to remote console 42 is completely independent of the state or type of operating system employed on server computer 32.

Taken together, the capability to send serial device input data 38 from remote console 42 to server computer 32 and the capability to retrieve video output data 40 from server computer 32 at remote console 42 provide a powerful remote management tool for distributed enterprise computing environment 30.

Figure 2:
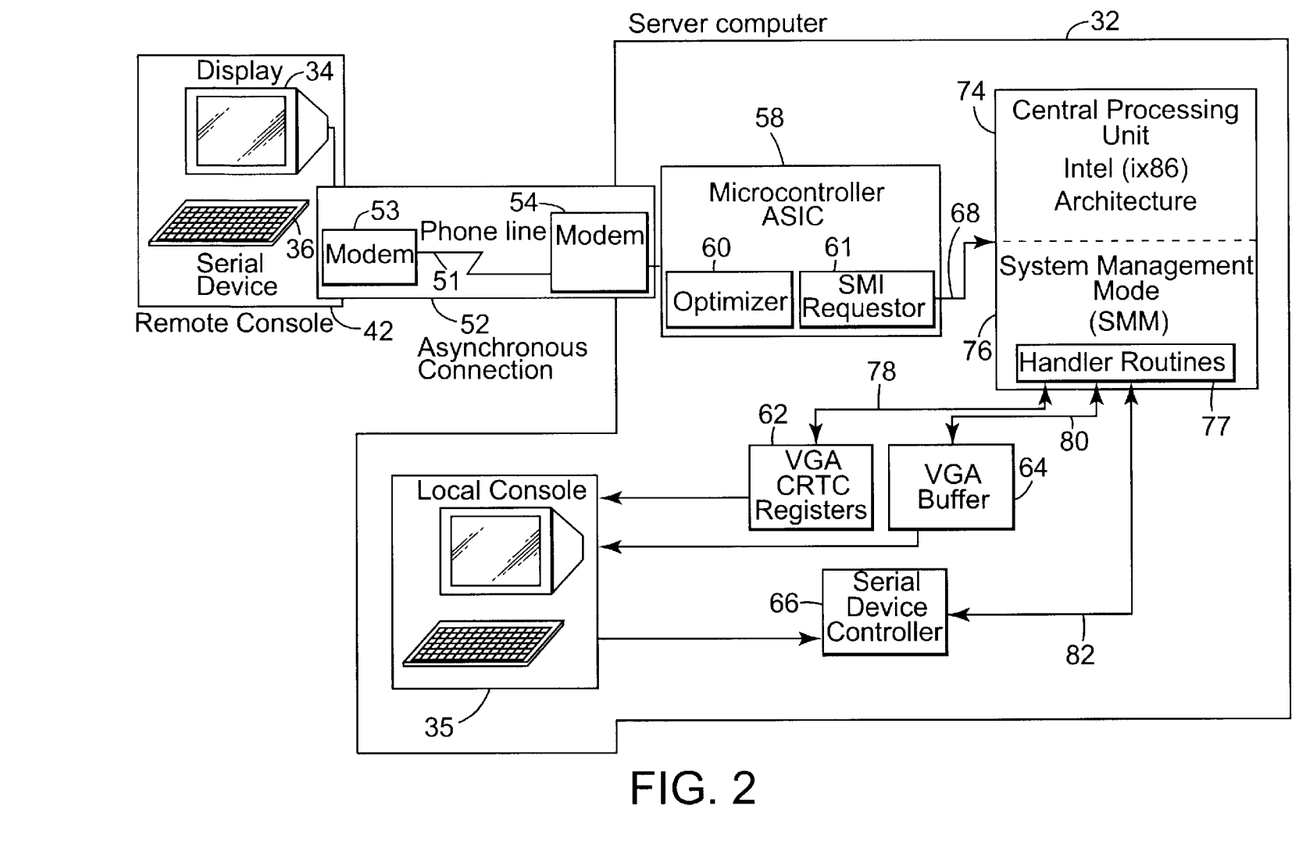
FIG. 2 is a detailed block diagram of a portion of the distributed computing environment including a server computer system incorporating the console redirection of the present invention, the remote console, and the asynchronous connection therebetween.

FIG. 2 is a detailed block diagram of a portion of a distributed computing environment incorporating the console redirection feature of the present invention. At a general level, remote console 42 communicates with server computer 32 via asynchronous connection 52. As described above in reference to FIG. 1, the present invention enables remote console 42 to send serial device input data to the server computer 32, and retrieve video output data from server computer 32.

In one embodiment, remote console 42 includes serial device 36 for entering input data. Example serial devices 36 include, but are not limited to: a keyboard; a mouse; a touchscreen; a keypad; a trackball; and an electronic tablet. Remote console 42 also includes display device 34 for displaying output data. In an exemplary embodiment, display device 34 is a video monitor. Remote console 42 is connected to server computer 32 by asynchronous connection 52. Example asynchronous connections 52 include, but are not limited to, a phone line or a direct serial connection. In the illustrated embodiment, modem 53 at remote console 42 communicates with modem 54 at server computer 32 over phone line 51 in order to link remote console 42 with server computer 32.

Server computer 32 includes a microcontroller ASIC 58 and a central processing unit (CPU) microprocessor 74. In one embodiment, the central processing unit (CPU) microprocessor 74 is of an Intel ix86 type design. However, the present invention is not limited in the use of Intel microprocessors, and is compatible with CPU microprocessors from other manufacturers that incorporate an integrated system management mode capability.

Microcontroller ASIC 58, otherwise known as a motherboard management controller (MMC), serves to control remote access to server computer 32. Microcontroller ASIC 58 serves as a "bridge" between remote console 42 and CPU 74. Upon receiving a redirection request from remote console 42, microcontroller ASIC's system management interrupt (SMI) controller 61 asserts an interrupt request directed toward CPU's 74 system management mode 76. In the illustrated embodiment, the CPU 74 is an Intel ix86 type microprocessor having an integrated System Management Mode (SMM) capability. Upon completion of servicing the interrupt request by CPU 74, a redirection result of the SMI request is returned to microcontroller ASIC 58.

In one embodiment, microcontroller ASIC 58 then optimizes redirection result through an optimizer 60, and returns the redirection result to remote console 42 via asynchronous connection 52. Optimizer 60 analyzes text mode display redirection results returned by the CPU's SMM 76, and determines what portions of current text mode display redirection results have changed from the previous redirection results returned. Optimizer 60 minimizes the amount of data returned to the remote console 42, by returning only the portion of text mode display redirection results that are different from the previous return operation.

In one preferred embodiment of the present invention, CPU 74 is a microprocessor having an Intel (ix86) style personal computer (PC) architecture. In an exemplary embodiment, CPU 74 is an Intel Pentium/Pentium II microprocessor having a system management mode (SMM) 76 capability. It is contemplated that microprocessors from other manufacturers which employ an (ix86) style of PC architecture and have similar system management mode capabilities will also work within the present invention.

The SMM 76 found within CPU 74 having an Intel (ix86) style PC architecture provides very high level functions, such as power management and security, in a manner that is transparent not only to the application software, but also to operating systems. In the Intel ix86 implementation of the system management mode, SMM 76 is one of the major operating modes within CPU 74, on a level with protected mode, real-address mode, or virtual-86 mode. In the context of the present invention, SMM 76 allows CPU 74 to directly read display register information from VGA CRTC registers 62. The SMM 76 also allows CPU 74 to directly read data from a VGA buffer 64. Finally, the SMM 76 allows CPU 74 to directly write serial input data to a serial device controller 66, independent of the operating system in use or the operating system's current operational state. Local console 35 also accesses VGA CRTC registers 62, VGA buffer 64, and serial device controller 66.

System Management Mode (SMM) 76 utilizes a set of handler routines 77 to process SMI requests received from microcontroller ASIC 58, and return redirection results to microcontroller 58. A first set of handler routines 77 directly accesses current display attributes from VGA CRTC registers 62 (i.e., Get CRTC Registers) and returns CRTC register results to microcontroller ASIC 58 (i.e., Got CRTC Registers). This first set of handler routines 77 uses display data stored in CRTC registers 62 to determine the origin of screen memory within the VGA buffer 64, as well as mono/color/graphics modes.

A second set of handler routines retrieves screen data from VGA buffer 64, starting at a specified character offset (i.e., Get Screen Data), then returns the screen data to microcontroller ASIC 58 (i.e., Got Screen Data). If a "delta" (i.e., change) bit is set, this SMI handler has the option of not returning screen data if the requested character data has not changed since the previous sample. Instead, the handler 77 returns a result of "1" and the length of the unchanged test span to microcontroller ASIC 58.

Another handler routine 77 directly writes serial input data to serial device controller 66 (i.e., Send Keystrokes) via a loopback command. In one embodiment, this loopback command causes the microcontroller 58 to place the indicated data byte in its output buffer, to be read by CPU 74. In other words, the next byte written to the input buffer will be written to the output buffer as if it is received from the server computer's local keyboard.

Figure 3:
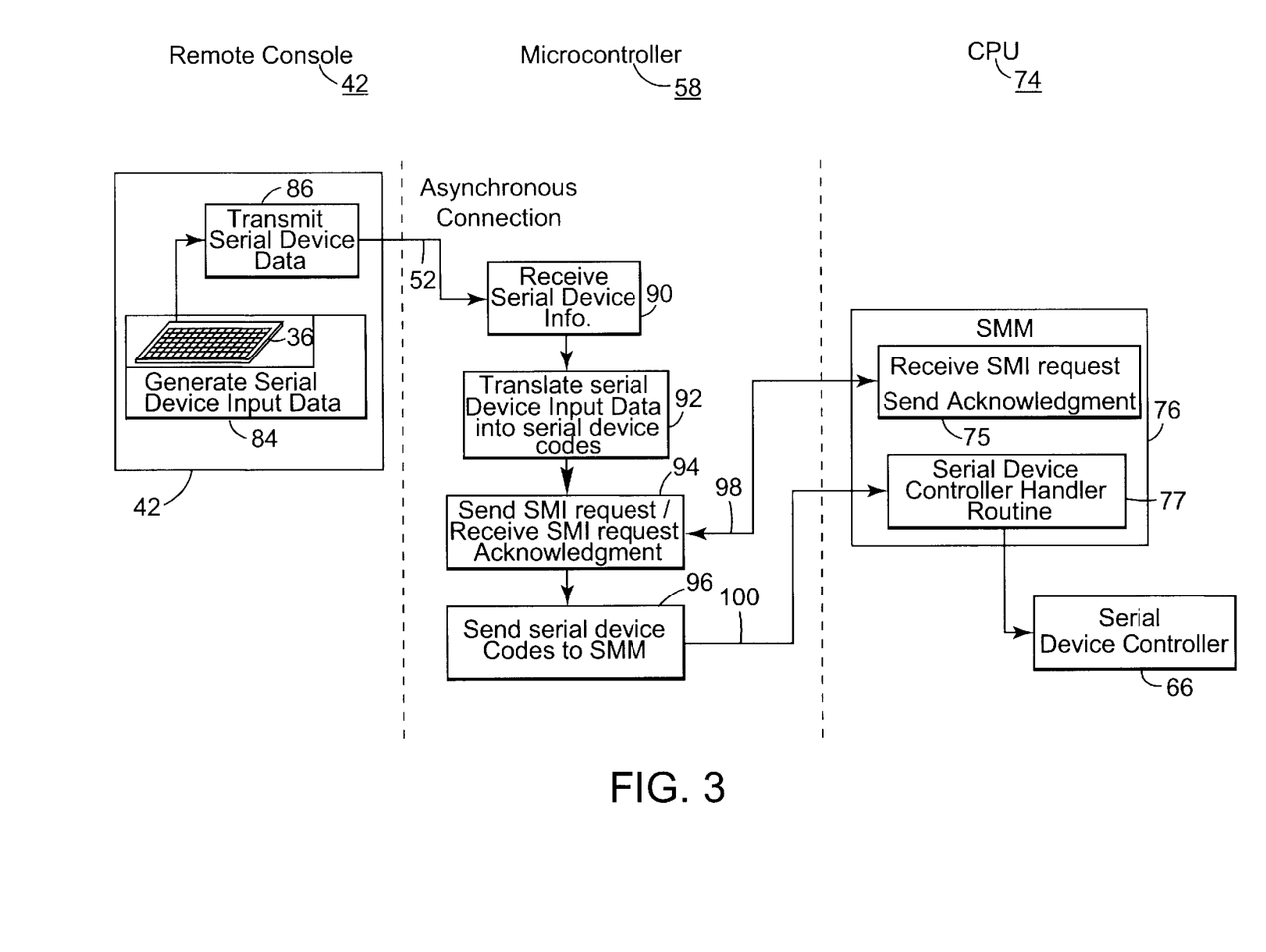
FIG. 3 is a detailed block and flow diagram illustrating the writing of serial device data from a remote console to a computer server.

FIG. 3 is a detailed block and flow diagram illustrating the writing of serial device input data from remote console 42 to server computer 32. As indicated at block 84, serial device input data to be passed to the server computer 32, is generated at the remote console 42. Serial device input data is then transmitted from remote console to microcontroller ASIC 58, as indicated at block 86.

Once the serial device input data is received by microcontroller ASIC 58, as indicated at block 90, microcontroller 58 proceeds to convert serial device input data into one or more serial device codes, as indicated at block 92. Microcontroller 58 then asserts an interrupt request (i.e., Send Keystrokes) intended for a system management mode 76 of CPU 74, notifying system management mode 76 that there is a request pending to write serial device input data. In one embodiment, CPU 76 is an Intel ix86 type microprocessor having an integrated System Management Mode (SMM) capability. After SMI request is acknowledged by system management mode 76 of CPU 74, the serial device codes are sent, as indicated at block 96, to system management mode 76 of CPU 74 in order to be processed by a serial device controller handler routine 77.

Upon receipt of the serial device codes, serial device controller handler routine 77 directly writes the serial device codes into a serial device controller 66 of server computer 32 via a loopback command. This direct write operation will occur even if the local keyboard of the server computer 32 is locked.

Figure 4A:
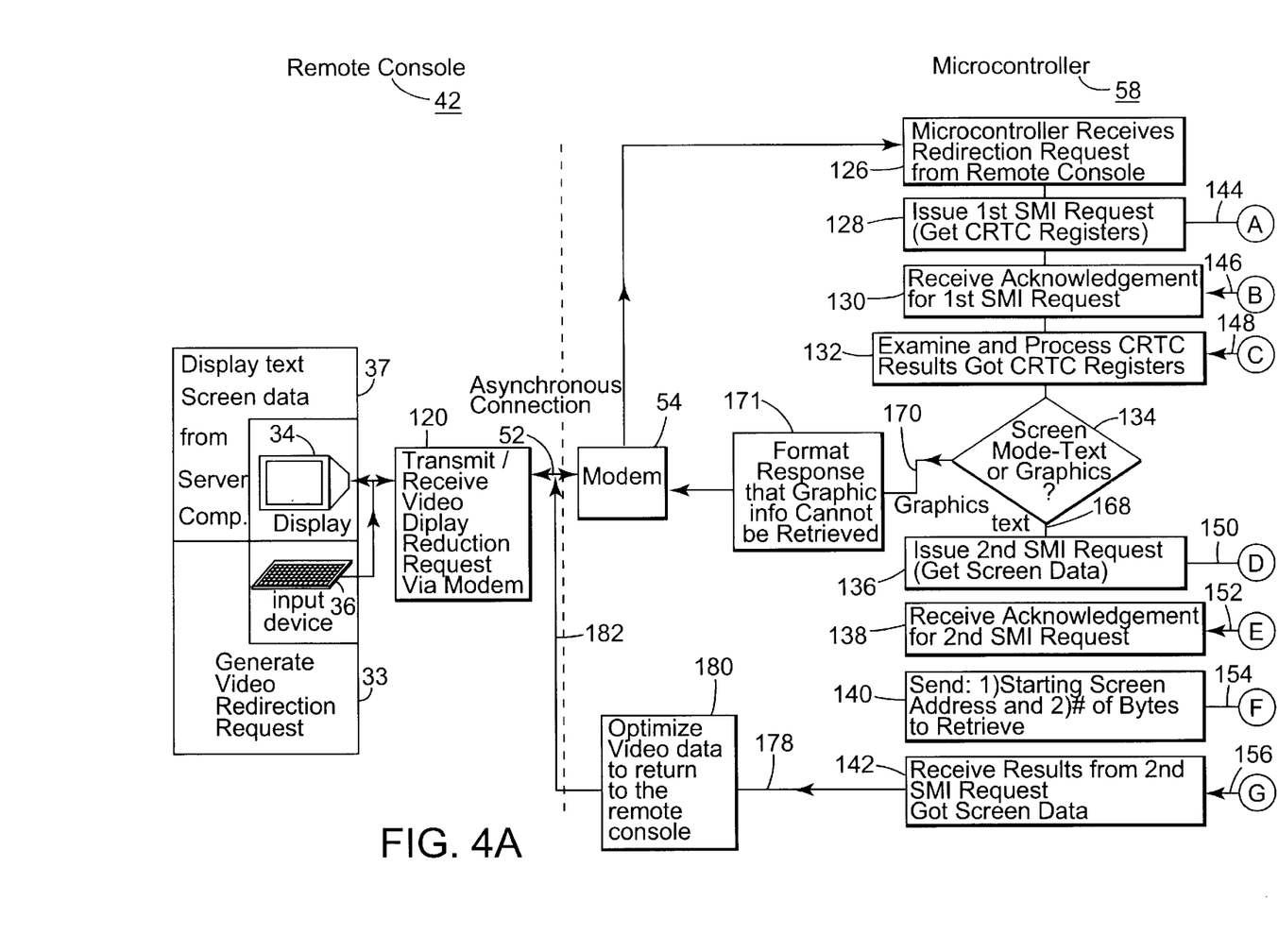
FIGS. 4A and 4B together form a detailed block and flow diagrams illustrating the reading of video data from a server computer by a remote console.
Figure 4B:
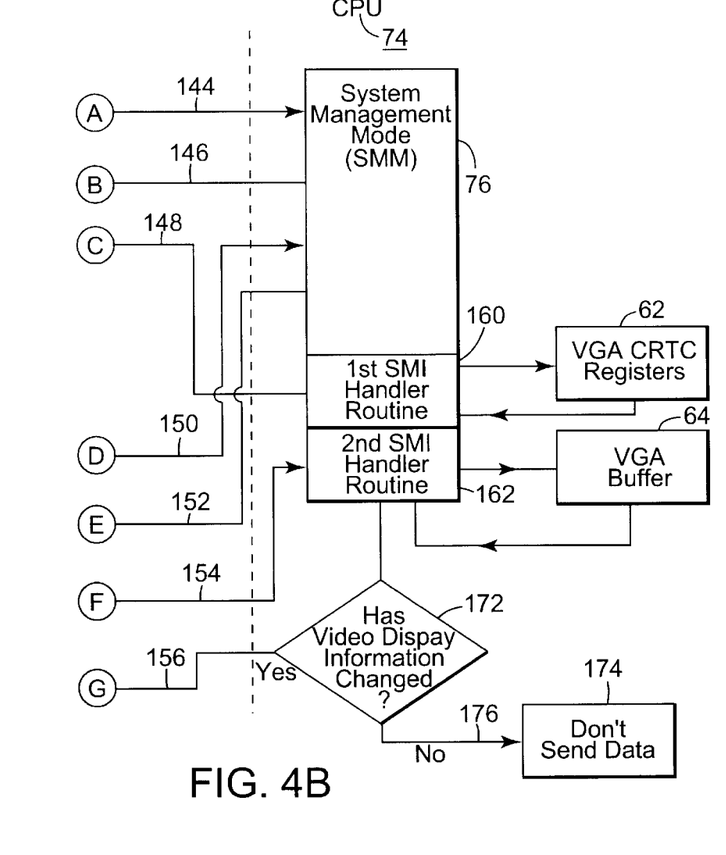

FIGS. 4A and 4B together form a detailed block and flow diagram illustrating the reading of video data from server computer 32 by remote console 42. A user at remote console 42 is capable of retrieving, among other data, the boot sequence of server computer 32, any text mode screen of server computer 32 when the operating system is up and running, and any text mode crash screen of server computer 32. Redirection of the video output data from server computer 32 to remote console 42 is completely independent of the state or type of operating system employed on server computer 32.

In one embodiment, the present invention only retrieves video output data that is displayed in a text mode. If a user attempts to retrieve graphics mode screen data, a message is returned to the user notifying the user of the "text screen mode only" limitation. Examples of video display modes (text screen modes) supported by the present invention include 80×25 color (VGA mode 3), 80×25 monochrome (VGA mode 7) and 80×50 color.

A display output redirection request is first generated by an input device 36 at a remote console 42, as indicated at block 33. The generated redirection request is then sent from remote console 42 to microcontroller ASIC 58, as indicated at block 120. Remote console 42 is connected to a microcontroller ASIC 58 of the server computer 32 via an asynchronous connection 52. Examples of asynchronous connections 52 include, but are not limited to, a phone line or direct serial connection. In the illustrated embodiment, a modem-to-modem asynchronous connection 52 is used to link remote console 42 with server computer 32.

Upon receiving redirection request from remote console, as indicated at block 126, microcontroller ASIC 58 issues SMI request, as indicated at block 128, intended for SMM 76 of CPU 74, notifying SMM 76 that there is an active display output redirection request pending. This first system management interrupt request (i.e., get CRTC registers) requests general video display attribute data from CPU 74, such as a screen mode, a cursor position, and a starting screen address from the VGA CTRC register 62. After first system management interrupt request is acknowledged by SMM 76 of CPU 74 and the acknowledgment is sent back to microcontroller 58, as indicated at block 130, a first system management interrupt handler routine 160 retrieves VGA CRTC register data 62, then returns VGA CRTC register data 62 to microcontroller ASIC 58. Upon receiving VGA CRTC register data 62, microcontroller ASIC 58 processes the data, as indicated at block 132, and determines whether current screen mode is text or graphics, as indicated at block 134.

If current screen mode is graphics, as shown at 170, a response is formatted notifying requester that only text screen mode data can be returned to requester, as indicated at block 171. This response is then passed back to display 34 of remote console 42 via asynchronous connection 52.

If current screen mode is text, as indicated at 168, a second system management interrupt request is asserted, intended for SMM 76 of CPU 74, notifying SMM 76 that there is another SMI request pending, as indicated at block 136. After second SMI request is acknowledged by SMM 76 of CPU 74 and the acknowledgment is sent back to microcontroller 58, as indicated at block 138, microcontroller ASIC 58 then passes, as arguments to SMM 76, a starting screen address and a number of bytes of text screen data desired, as indicated at block 140. Second SMI handler routine 162 retrieves text screen data from VGA buffer 64, then determines whether video display data has changed from the last handler request, as indicated at block 172. If video display data has not changed, as indicated at 176, video display data is not returned to microcontroller ASIC 58, as indicated at block 174. However, if video display data has changed, video display data is returned to microcontroller ASIC 58, as indicated at 156.

Upon receiving video display data from SMM 76 second handler routine 162, as indicated at block 142, microcontroller ASIC 58 then optimizes, if possible, returned video display data, as indicated at block 180. In this optimization, currently retrieved video display data is compared with the video display data previously returned to remote console 42 to determine which text screen data has changed. Once a set of changed data has been determined, only changed data is sent back to remote console 42, as indicated at block 182, in order to minimize the amount of data that needs to be returned, thus increasing the efficiency of the data transfer. This response is then passed back to remote console 42 via asynchronous connection 52. At block 37, the returned video display data is directed to display 34.

The simple, low-cost redirection capability of the present invention is designed to replace the expensive bus-mastering cards currently in use in server computers 32. In one embodiment, the present invention combines a low-cost, dedicated application specific integrated circuit (ASIC) microcontroller 58 mounted on the motherboard of the computer server 32, and the system management mode 76 functionality already incorporated into the Intel ix86 family of processors 74 to provide the redirection capability. The present invention provides the ability to view the server computer's 32 video output data and send serial device input data independent of the operating system. A user at a remote console 42 can view and interact with, among others: the boot sequence, any text mode screen when the network operating system is up and running, and any text mode crash screen.

Through the combined use of a low-cost, dedicated microcontroller ASIC 58 integrated on the motherboard of a server computer 32 and a system management mode 76 capability found within the CPU 74 of the server computer 32, the present invention provides an inexpensive, operating system independent apparatus and method for redirecting a server computer's 32 display output data and serial device input data to a remote console 42.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the electrical and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer system communicating with a remote console via an asynchronous connection, the computer system comprising:

a microcontroller coupled to the asynchronous connection, which receives a redirection request from the remote console, asserts a system management interrupt to process the redirection request, and returns a redirection result to the remote console via the asynchronous connection upon completion of the system management interrupt request; and a central processing unit (CPU) having a system management mode for controlling a set of routines which are responsive to the system management interrupt asserted by the microcontroller, to process the system management interrupt request, generate the redirection result, and return the redirection result to the microcontroller.

2. The apparatus of claim 1, wherein the system management interrupt request is to read display output data from the computer system.

3. The apparatus of claim 1, wherein the system management interrupt request is to write serial device input data to the computer system.

4. The apparatus of claim 3, wherein said serial device input data is generated from a keyboard at the remote console.

5. The apparatus of claim 3 wherein said serial device input data is generated from a mouse at the remote console.

6. The apparatus of claim 1, wherein the redirection request is processed independent of the operating system residing on the computer.

7. The apparatus of claim 1, wherein the microcontroller is a dedicated application specific integrated circuit (ASIC) device mounted on a motherboard within the computer.

8. The apparatus of claim 1, wherein said redirection result includes video display data related to the computer system's boot sequence.

9. The apparatus of claim 1, wherein said redirection result includes text mode screens when an operating system is up and running.

10. The apparatus of claim 1, wherein said redirection result includes text mode crash screens.

11. The apparatus of claim 1, wherein video display modes supported by the redirection include: 80×25 color (video graphics array (VGA) mode 3), 80×25 monochrome (VGA mode 7) and 80×50 color.

12. The apparatus of claim 1, wherein the microcontroller optimizes the redirection results returned to the remote console so that only the portions of the display data that have changed from a previous display output operation are sent back to the remote console.

13. The apparatus of claim 1, wherein the CPU is of an Intel ix86 type architecture.

14. The apparatus of claim 13, wherein the CPU is an Intel Pentium processor.

15. The apparatus of claim 1, wherein the system management interrupt is Intel Corporation's System Management Interrupt (SMI).

16. The apparatus of claim 1, wherein the system management mode is Intel Corporation's System Management Mode (SMM).

17. A method for enabling a computer system to receive serial device data from a remote console via an asynchronous connection, the method comprising the steps of:

transmitting serial device data from the remote console to a microcontroller via the asynchronous connection;

translating the serial device data into a plurality of serial device codes at the microcontroller;

asserting a system management interrupt request at the microcontroller in order to send the serial device codes from the microcontroller to a central processing unit (CPU);

acknowledging the system management interrupt request at the CPU through a system management mode handler residing within the CPU;

sending the plurality of serial device codes from the microcontroller to the CPU upon a successful acknowledgment from the CPU; and receiving the plurality of serial device codes through the system management mode handler residing within the CPU, the system management mode having a set of routines for directly writing the plurality of serial device codes into a serial device controller.

18. The method of claim 17, wherein said serial device is a keyboard.

19. The method of claim 17, wherein said serial device is a mouse.

20. The method of claim 17, wherein the system management interrupt is Intel Corporation's System Management Interrupt (SMI).

21. The method of claim 17 wherein the system management mode is Intel Corporation's System Management Mode (SMM).

22. A method for enabling a remote console to retrieve video display data from a computer system via an asynchronous connection, the method comprising the steps of:

transmitting a video display redirection request from the remote console to a microcontroller via the asynchronous connection;

issuing a first system management interrupt request from the microcontroller to retrieve video graphics array (VGA) display register data via a central processing unit (CPU);

acknowledging said first system management interrupt request through a first system management mode handler routine residing within the CPU;

servicing the first system management interrupt request through the first system management mode handler routine residing within the CPU, wherein the first system management mode handler routine retrieves the VGA display register data, and returns the VGA display register data to the microcontroller;

examining the VGA display register data at the microcontroller, then issuing, if appropriate, a second system management interrupt request from the microcontroller to retrieve text screen data from VGA buffer via the CPU;

reading and acknowledging the second system management interrupt request through a second system management mode handler routine residing within the CPU;

processing the second system management interrupt request through the second system management mode handler routine residing within the CPU, wherein the second handler routine retrieves the text screen data from the VGA buffer, and returns the text screen data to the microcontroller; and receiving the text screen data at the microcontroller from the CPU, optimizing the set of text screen data, then returning the text screen data in an appropriate format to the remote console via the asynchronous connection.

23. The method of claim 22, wherein the first handler routine retrieves a screen mode, a cursor position, and a starting screen address from the VGA CRTC registers.

24. The method of claim 23, wherein if, upon the examination of the VGA CTRC registers at the microcontroller, it is determined that the text screen mode is graphics, an appropriate message is returned to the remote console, and the video display retrieval is terminated.

25. The method of claim 24, wherein the second system management mode handler routine for getting the text screen data accepts the starting screen address and a number of bytes of text screen data desired as arguments.

26. The method of claim 22, wherein the optimization of text screen data in the receiving step includes minimizing the amount of data returned to the remote console by providing only the display data that has changed from a previous video data retrieval.

27. The method of claim 22, wherein the second system management mode handler routine will not return the text screen data if the text screen data has not changed since the previous data retrieval.

28. The method of claim 22, wherein the retrieval of the video display data is performed independent of the operating system residing on the computer system.

29. The method of claim 22, wherein the returned screen data can include: video display data related to the computer system's boot sequence, text mode screens when an operating system is up and running, and a text mode crash screen.

30. The method of claim 22, wherein the returned text screen data includes video display data related to the computer system's boot sequence.

31. The method of claim 22, wherein the returned text screen data includes text mode screens when an operating system is up and running.

32. The method of claim 22, wherein the returned text screen data includes text mode crash screens.

33. The method of claim 22, wherein the first and second system management interrupts are Intel Corporation's System Management Interrupt (SMI).

34. The method of claim 22 wherein the system management mode is Intel Corporation's System Management Mode (SMM).

* * * * *